Dec. 12, 1939.   E. H. KOCHER   2,182,811
PIPE COUPLING
Filed May 26, 1934
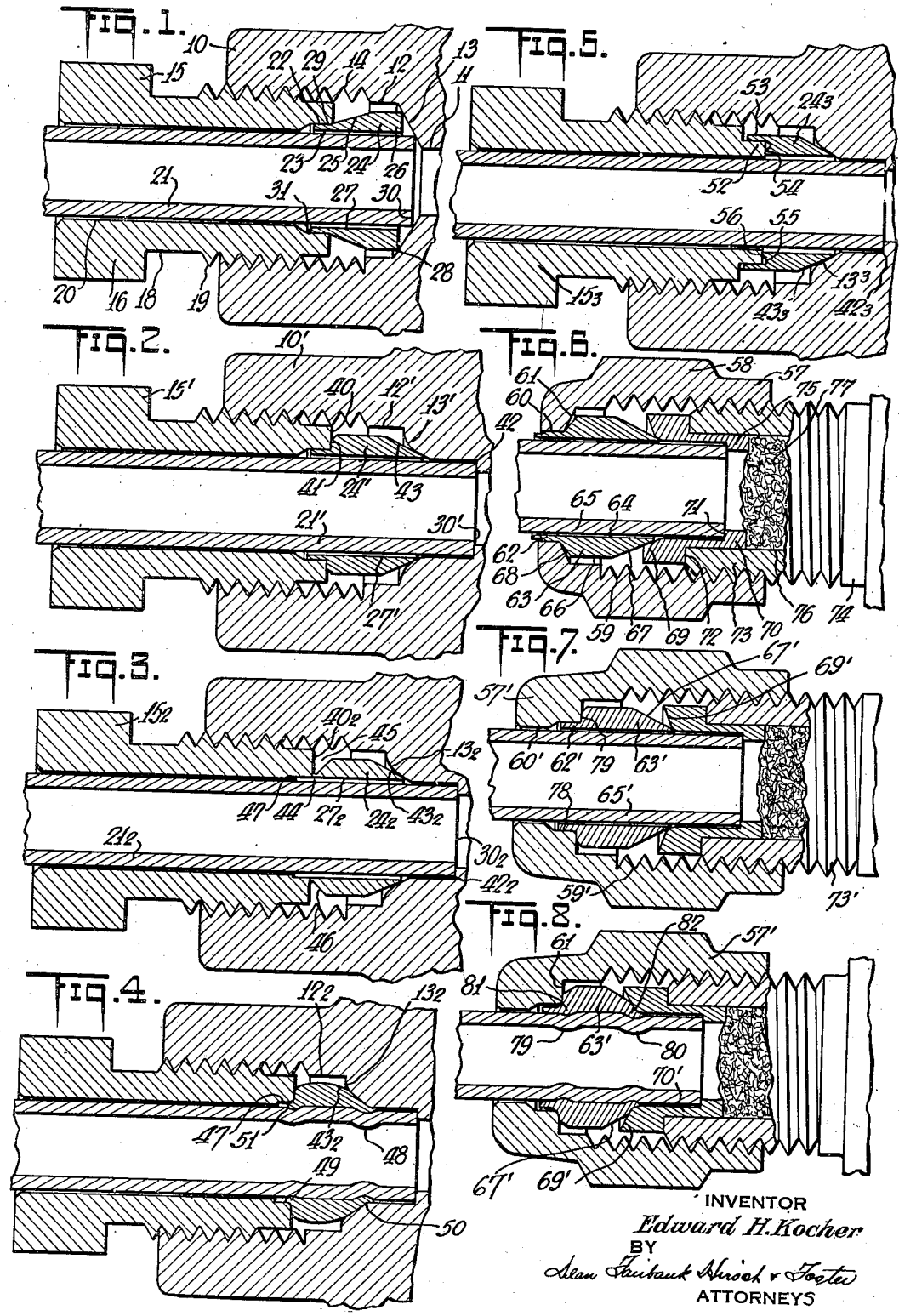
INVENTOR
Edward H. Kocher
BY
Alan Fairbank Hirsch & Foster
ATTORNEYS Patented Dec. 12, 1939

2,182,811

UNITED STATES PATENT OFFICE 2,182,811

PIPE COUPLING

Edward H. Kocher, Boonton, N. J., assignor to Auto Research Corporation, a corporation of Delaware Application May 26, 1934, Serial No. 727,719

8 Claims. (Cl. 285—123)

The present invention relates to couplings, and it particularly relates to compression coupling connections, particularly adapted for metallic tubing, such as aluminum, copper and brass tubing of relatively small diameter and bore.

Considerable difficulty has been encountered with compression couplings in which a tubing end is gripped by a tapered sleeve deformed between and by a threaded bushing or tapped nut screwed into a tapped socket or onto a threaded nipple on a mounting element, due to the cocking of the relative small compression coupling sleeves. When the axes of such sleeves are inclined or cocked at an angle to the axes of the tubing ends, defective coupling joints will be formed which will not be lubricant or liquid-tight.

The proper connection of these couplings require the handling of the small sleeves, placement of them upon the tubing ends, insertion of the tubing ends into the threaded nipples or tapped sockets of the mounting elements, and tightening up of the threaded bushings or tapped nuts, all with skill and care to make certain that the tubing end and the sleeve will each be placed in proper position in respect to each other, and also the bushings or nuts and the tubing ends. As a result, when assembly is made, considerable delay is encountered and substantial manual effort is demanded. This special handling and delay is particularly disadvantageous in large scale mass production operation, as for example, on automobile assembly lines where these couplings are utilized to join together tubing sections to each other through junctions, or to bearings in connection with lubricating systems, gasoline lines and/or so forth.

Among the objects of the present invention are to provide a compression coupling arrangement of the character described, which is self-aligning and devoid of cocking tendencies, which will effect a particularly secure and fluid-tight connection and which is capable of ready disconnection without mutilation.

Another object is to provide a compression coupling arrangement in which the arrangement may be preassembled before being shipped from the place of manufacture to the place of utilization, so that it is possible, for example, for the man at the assembling position to assemble the coupling with a maximum of convenience and with a minimum of manipulation of time and expenditure without separate handling of the sleeve and nut.

A special feature of the present invention is a provision of a connection between the coupling sleeve and with the nut or bushing to align the coupling sleeve or structure, eliminating any tendency thereof to cock and enabling the coupling sleeve and the nut to be preassembled at the place of manufacture. The assembled unit may be shipped as such to the place of utilization, and the coupling connection may be made by inserting the tubing end in position in the unit and slightly tightening the nut or bushing.

Another feature of the invention is to provide cooperating abutting surfaces between the compression coupling sleeve and the nut or bushing and between the compression coupling sleeve and the mounting structure so that the sleeve will be held against turning on a greater radius by its contact with the mounting structure than it will be turned by the nut or bushing during the tightening operation.

In the drawing, which shows several of the various possible embodiments of the several features of the invention:

Figs. 1, 2, 3 and 5 are longitudinal sectional views, respectively illustrating different embodiments of the present invention as applied to a coupling bushing with the coupling sleeve in position without it being deformed to grip the tubing end.

Fig. 4 is a longitudinal sectional view of the embodiment shown in Fig. 3 after such coupling sleeve has been deformed in position to grip the tubing.

Figs. 6 and 7 are longitudinal sectional views illustrating the combination of a coupling sleeve with a coupling nut with the tubing end in position before the coupling sleeve has been deformed to grip the tubing end.

Fig. 8 is a longitudinal sectional view of the embodiment shown in Fig. 7 after the tubing end has been gripped in position.

Although the coupling connections of the present invention are broadly adapted to various utilizations they will be particularly described in connection with T fittings, such as shown in Figs 2 and 5 of the copending application Serial No. 502,900, filed December 17, 1930 now Patent No. 2,029,325 of February 4, 1936, and also in connection with drip plug fittings of the character shown in Fig. 6 of said same application.

In the present drawing, Figs. 1 to 5 illustrate the application to a T junction or to a tapped socket structure, while Figs. 6 to 8 illustrate the application to a drip plug or other threaded nipple structure, both of which are particularly designed to be utilized in central lubricating systems, especially central chassis lubricating systems.

In Fig. 1 the mounting structure 10, which may take the form of an arm or a stem of a T or a boss on a bearing structure, is provided with an inlet bore 11, which has an enlargement 12, forming a socket. The bottom of the enlargement 12 has a sloping abutment 13. The socket or enlargement 12 at the end of the bore 11 is tapped, as indicated at 14, to receive the nut 15.

The nut 15 is provided with a head, preferably of hexagon or square shape, to receive a wrench or other turning tool, and is provided with a shank 18, the end portion of which is threaded at 19 to fit into the tapped portion 14 of the socket 12.

The nut is provided with a central opening 20 which receives the tubing end 21. The tubing end 21 abuts against the sloping bottom 13 of the enlargement or socket 12.

The inner end of the bore 20 of the nut 15 is provided with an enlargement 22 of cylindrical shape which is adapted to receive the guide sleeve extension 23 of the coupling sleeve 24. The coupling sleeve 24 has an inwardly diverging tapered surface 25 between the guide portion 23 and the cylindrical portion 26 which abuts the sloping bottom 13 of the socket 12 at its outer edge 28. It will be noted that the bore of the sleeve 27 is somewhat larger than the bore 20 of the nut 15.

As shown in Fig. 1 the tubing coupling connection has not as yet been made. In making the connection the sleeve 24 is slipped into the recess 22 in the nut 15, the dimensions of the parts being such that a tight connection will be formed. Then the sub-unit consisting of the coupling nut 15 together with the connected coupling sleeve 24 may be slipped over the end of the tubing 21, or more preferably the coupling nut assembled with the sleeve 24 as a unit may be screwed into position until the outer edge 28 of the sleeve portion 26 will contact with the sloping shelf 13 at the bottom of the socket 12.

In the last mentioned instance, the T head or other junction fitting containing the bushings 15 with the attached sleeves 24 may be shipped around as assembled units, requiring only that the tubing ends 21 be put into position before tightening of the connection to make the coupling.

Upon tightening of the nut or bushing 15, the outer end of the sloping portion 25 will be crimped against the tubing end 21, while the edge 28 of the bushing will bite into the shelf 13. This will form a liquid tight connection and at the same time the guide sleeve 23 will be broken away from the recess 22 so that the nut 15 may be readily subsequently removed without detaching the sleeve 24 from the tubing end 21.

It will be noted that the nut 15 will wedge the sleeve 24 inwardly at the point 29, which is much inside of the point 28. As a result, the radius of wedging in respect to the turning nut will be much less than the radius of wedging between the sleeve 24 and the connecting member 10, so that the sleeve 24 will not be turned by the nut and there will be no danger of twisting the tubing during the tightening operation.

It is evident therefore that the arrangement shown in Fig. 1 provides both aligning means permitting a compression coupling to be preassembled without danger of cocking and also assures that the tubing will not be twisted during the coupling operation.

The diameter of the bore 28 in the sleeve 24 is slightly larger than the diameter of the bore 20 in the nut 15 so as to tend to prevent the tubing end 21 catching on the sleeve 24 when the tubing end 21 is passed from within the nut 15 to within the sleeve 24. This construction is particularly advantageous when the tubing is slightly bent or is inserted at a slant, as otherwise the inner edge of the tubing 30 might contact and catch with the edge of the sleeve 31. This might make it seem to one inserting the tubing end 21 that its end 30 had already reached the shelf 13 at the bottom of the socket and he would then tighten up the connection and make a defective coupling.

In Figs. 2, 3 and 5, are shown different embodiments in which similarly functioning parts are indicated by the same numerals provided respectively with a prime, an inferior 2, and an inferior 3.

In Fig. 2 the end of the nut 40 contacts with a shoulder 41 on the sleeve 24' so that the end of the nut 15' will exert an axial pressure through the body of the sleeve 24'. The bottom of the socket 12' is rounded at 13' and the tubing end 21' extends beyond this rounded portion 13' to the shoulder 42 at the beginning of the enlargement 12'.

It will be noted that the inner end 43 of the sleeve 24' is tapered inwardly so as to contact with the rounded surface 13' adjacent the bottom of the socket 12'.

When the nut 15' is tightened the sleeve 24' will be crushed inwardly at the contact 40—41 so that it will crimp the tubing end 21 at this point. The tapered portion 43 will be deformed against the rounded portion 13' with the result that the radius of the contact area in respect to the connecting element 10' of the T fitting or other mounting structure will be much greater than the radius of the contact area between the nut 15' and the sleeve 24'.

In Fig. 3 the sleeve 24₂ is connected to the end 40₂ of the nut 15₂ by a thin piece of metal 44 which has been formed by cutting inwardly with a cutting tool at 45. The cut 45 is made in such a way that the adjacent surface of the sleeve, as indicated at 46, will be tapered toward the axis of the tubing outwardly.

As a result a double tapered sleeve 24₂ will be formed integrally connected to the nut 15₂. When the nut 15₂ is tightened, the thin piece of metal at 44 will be broken and the sleeve will be deformed adjacent the edges of its inner taper 43₂ and its outer taper 45, doubly deforming and gripping the tubing.

It will be noted that the enlarged diameter 27₂ on the inside of the sleeve 24₂ is extended beyond the sleeve 24₂ to the point 47, so as to prevent catching of the tubing and more ready passage of the end of the tubing 30₂ when being inserted into the nut and sleeve unit 15₂—24₂.

When the bushing 15₂ is tightened and the coupling is completed, the effect will be as shown in Fig. 4. It will be noted that the tubing is doubly deformed, as indicated at 47 and 48 and with the sleeve being deformed, as indicated at 49 and 50. As shown, the inner taper 43₂ has been rolled up against the curved bottom portion 13₂ of the socket 12₂ and that the thin edge 44 has been broken and has been deformed into the projecting edge appearing at 51 where it conveniently fits into the extended recess.

In Fig. 5 the nut or bushing 15₃ is provided with an extension 52 of reduced diameter which fits into the sleeve extension 53 of the coupling sleeve 24₃.

The inside face of the sleeve 54 is provided with an annular groove 55 with the result that the sleeve will primarily be pressed by the nut 15₃ at its edge 56 inside of the groove 55.

The tapered face 43₃ of the sleeve 24₃ will roll up against the curved shoulder 13₃ of the socket and will resist any turning moment due to contact between the edges 56 and the extension 52 of the nut or bushing 15₃.

The coupling connections of Figs. 1 to 5 are particularly designed for structures or nipples containing threaded sockets as in connection with junctions and bearing structures.

Figs. 6 to 8 relate to the application of the novel principles of the present invention to tubing couplings to threaded nipples, as for example to drip plug structures of the character disclosed in Patents No. 1,632,771 and No. 1,632,772.

In Fig. 6 the nut 57 is provided with a hexagon portion 58 to enable turning by a wrench. The nut has a central tapped socket 59 and the top of the nut or cap 57 is provided with a central opening 60. Inside of the opening 60 is the tapered shoulder 61 forming a bottom for the tapped socket 59.

The opening 60 receives the cuff 62 constituting an extension of the coupling sleeve 63. The sleeve 63 is provided with a bore 64 closely embracing the tubing end 65 and with an outside cylindrical face 66 between the relatively steep taper 67 and the relatively blunt taper 68.

The cuff or extension 62 received in the opening 60 in the top of the nut or cap 57 enables the sleeves 63 and the nut 57 to be assembled together as a unit. The cooperating tapers 61 and 68 assure a crimping or deforming contact between the nut 58, and the sleeve 63, causing deformation of the coupling sleeve and gripping of the tubing end 65.

The inner taper 67 contacts with a relatively blunt taper 69 on the hard metal sleeve 70 and is adapted to be deformed by said sleeve so as to roll inwardly and crimp the tubing 65 and to be deformed over the surface of said bevel 69. The contact between the taper 67 and the bevel 69 will keep sleeve 63 from turning with the nut or cap 58 when it is being screwed into position.

The hard metal sleeve 70 is provided with a shoulder 71 which receives and forms an abutment for the tubing end 65. The sleeve 70 is also provided at a shoulder 72 which rests upon the end of the threaded nipple 73 of the drip plug structure 74. The skirt 75 of the sleeve 70 closely fits into the socket 76 of the drip plug and annularly clamps the filter or strainer member 77 in position in said socket.

Fig. 7 shows another embodiment, similar to that disclosed in connection with Fig. 6, similarly functioning parts being designated by the same numerals primed.

In Fig. 7, the opening 60' in the top of the nut 57' more closely encircles the tubing end 65' and the extension 62' of the sleeve 63' is received in an enlargement 78 at the bottom of the socket of the nut between the opening 60' and the tapped socket 59'. The tapered coupling sleeve 63' is provided with a relatively square shoulder 79, against which the nut 57' presses, in forcing the sleeve into deforming combination with the tubing end 65'.

Fig. 8 shows the coupling of Fig. 7 after the coupling has been made and the nut 57' has been tightened upon the nipple 73'. It will be noted that the tubing has been crimped or deformed inwardly at 79 and 80 due to compression of the tapered coupling sleeve 63' at 81 and 82 by the shoulder 61' of the coupling nut 57 and the bevelled portion 69' of the sleeve 70'.

It is obvious that by utilizing the present invention, it is possible to sell and preassemble the coupling sleeve and the nut or bushing to form units, which may be applied upon assembly of the tubing end to a threaded nipple or tapped socket without difficulty and without the need of laboriously and separately handling the relatively small tapered coupling sleeves apart from the nut or bushing.

The telescoped connection between the nut or bushing and the tapered coupling sleeve is most readily broken upon tightening of the coupling and subsequently, if desired, the bushing or nut may be removed from the nipple or socket without disturbing the connection of the coupling sleeve to the tubing end. Moreover, the coupling is effected without twisting of the tubing and without danger of cocking the tapered sleeve, with a resulting improper connection.

It is obvious that the above showings are merely illustrative and that the invention may be widely applied to various couplings which are included in the scope of the appended claims.

Although the dimensions and angles may be widely varied, in certain instances in commercial practice it has been found satisfactory to utilize certain dimensions and angles.

For example, in Fig. 1, the angle of the taper 25 may be about 18°, while the diameters of the pipe exterior 21, of the bushing bore 20, of the bushing recess 22, and of the sleeve bore 27 may be respectively about 0.156, about 0.162, about 0.184, and about 0.170 inch respectively. In Fig. 2, these diameters may be about the same and the angles of the bevels 43 and 13' may be about 25° and 30°, respectively.

In Fig. 3, for example, with the same external tubing bushing bore and sleeve bore diameters, the sleeve bore diameter is extended to the shoulder 47, and with the same angles at 43₂ and 13₂, the angle of the taper 46 may be about 45° and the bottom diameter of the cut 45 about 0.178 inch.

In Figs. 5, 6 and 7, with the same external pipe diameters, the internal sleeve bore diameters respectively may be about 0.166, about 0.162, and about 0.166, the angles of the bevels 43₃, 67 and 67' may in each instance be about 25°, the angle of the bevels 69 and 69' may be about 70°, and the diameters of the press-fitted connections 52—53, 60—62 and 60'—62' may be about 0.210, 0.177 and 0.181 inch respectively. The bevel 68 of Fig. 6 may have an angle of about 45°.

I claim:

1. In a tubing compression coupling connection for a lubricating system, a tubing end, a threaded mounting element provided with a shoulder member to abut said tubing end and a bore placed in lubricant tight communication with said tubing, an annular threaded coupling element received on said tubing and screwed onto said mounting element, said mounting and coupling elements having internal annular shoulders adjacent the tubing wall, an annular tapered sleeve element, received on said tubing and wedged between said internal annular shoulders on said mounting and coupling elements and crimped thereby onto said tubing upon screwing and tightening of said coupling element to said mounting element, said sleeve before making the coupling connection having a frangible connection to said coupling element, whereby said coupling element and said sleeve may be initially assembled, stored, shipped, and handled as a single unit and said frangible connection may be broken by screwing said coupling element in place in respect to said mounting element to crimp said sleeve about said tubing, said sleeve having an increased internal diameter relatively to said coupling element to assure that no abutment of said tubing end will take place at said frangible connection.

2. In a tubing compression coupling connection for a lubricating system, a tubing end, a threaded mounting element provided with a shoulder member to abut said tubing end and a bore placed in lubricant tight communication with said tubing, an annular threaded coupling element received on said tubing and screwed onto said mounting element, said mounting and coupling elements having internal annular shoulders adjacent the tubing wall, an annular tapered sleeve element, received on said tubing and wedged between said internal annular shoulders on said mounting and coupling elements and crimped thereby onto said tubing upon screwing and tightening of said coupling element to said mounting element, said sleeve before making the coupling connection having a frangible connection to said coupling element, whereby said coupling element and said sleeve may be initially assembled, stored, shipped and handled as a single unit and said frangible connection may be broken by screwing said coupling element in place in respect to said mounting element to crimp said sleeve about said tubing, said frangible connection being formed by providing an internal annular recess in the inside of said coupling element and by providing an annular flange or cuff on the adjacent end of said sleeve fitting into said recess, said flange being of substantially lesser depth than said recess whereby it will not completely fill the same and whereby the frangible connection will be most readily broken.

3. The coupling connection of claim 1, the coupling element consisting of an internally threaded nut and the mounting element consisting of an externally threaded nipple.

4. The coupling connection of claim 1, the mounting element including an internally threaded socket and the coupling element including an externally threaded bushing.

5. The coupling connection of claim 1, said frangible connection consisting of a thin integral metal collar connecting said coupling element and said sleeve element.

6. The coupling connection of claim 1, said frangible connection consisting of an extension cuff on the sleeve element and a recess to receive said cuff on the end of the coupling element.

7. The connection of claim 2, said mounting element consisting of an externally threaded nut and said coupling element consisting of an internally threaded socket.

8. The coupling connection of claim 2, said coupling element consisting of an internally threaded tapped nut and said mounting element consisting of an externally threaded nipple.

EDWARD H. KOCHER.